United States Patent [19]

Barlow et al.

[11] Patent Number: 4,900,123
[45] Date of Patent: Feb. 13, 1990

[54] 1550 NM FIBER DISTRIBUTION PANEL

[75] Inventors: Robert W. Barlow, Canton; David A. Cooper, Loganton, both of Pa.

[73] Assignee: GTE Products Corporation, Stamford, Conn.

[21] Appl. No.: 237,477

[22] Filed: Aug. 29, 1988

[51] Int. Cl.⁴ .......................... G02B 6/36; G02B 7/26
[52] U.S. Cl. ................................................ 350/96.20
[58] Field of Search ........................... 350/96.20, 96.21

[56] References Cited

U.S. PATENT DOCUMENTS

| | | | |
|---|---|---|---|
| 4,266,853 | 5/1981 | Hutchins | 350/96.20 |
| 4,595,255 | 6/1986 | Bhatt et al. | 350/96.20 |
| 4,679,896 | 7/1987 | Krafcik et al. | 350/96.20 |
| 4,702,551 | 10/1987 | Coulombe | 350/96.20 |
| 4,717,231 | 1/1988 | Dewez et al. | 350/96.20 |
| 4,790,626 | 12/1988 | Bonicel et al. | 350/96.20 |
| 4,793,682 | 12/1988 | Cooper | 350/96.20 |

*Primary Examiner*—William L. Sikes
*Assistant Examiner*—Robert E. Wise
*Attorney, Agent, or Firm*—William H. McNeill

[57] ABSTRACT

Apparatus for selectively interfacing first optical fibers with second optical fibers including a stationary housing having a connector panel and storage cassettes, and a slideable drawer having a splice tray and a fiber and pigtail take-up enclosure.

20 Claims, 6 Drawing Sheets

1550 NM FIBER DISTRIBUTION PANEL

BACKGROUND OF THE INVENTION

1. Field of the Invention

The present invention relates to apparatus for interfacing optical fibers of external; that is, outside plant fiber optical cable with optical fibers of internal; that is, inside plant fiber optical cable. For example, the present invention relates to interfacing external fiber optical cable with internal fiber optical cable connected to telephone transmission equipment. The apparatus serves as an integrated connector panel, splice shelf and cable storage unit for interconnection between outside plant cable and fiber optic testing, multiplexing and transmission equipment.

2. Description of The Prior Art

In prior art fiber optical cable interfacing apparatus access to the housing in which optical fibers are spliced and coupled to the appropriate optical connectors is from the front and rear of the housing. To gain access, a covering panel is removed to expose the inside of the housing to the extent desired. Typically, one or more splice trays are contained in the housing. Since space is usually limited it is difficult, if possible at all, for a technician to perform various tasks within the apparatus such as splicing of optical fibers, repair of a splice, and the like. Therefore, in many applications the apparatus is designed such that removal of a covering panel allows the technician to remove the splice tray or the fibers from the tray to perform the task at hand. Usually any excess length of cable or fiber is stored in the tray, storage in this manner tending to cause undesirable attenuation and in some instances excessive kinking or bending of the optical fiber being stored. In such apparatus testing and service is difficult.

One attempt to overcome the problems associated with such prior art apparatus is described in U.S. Pat. No. 4,708,430 which relates to a cabinet for optical cable terminating equipment. Such cabinet includes a removable front cover, a stack of splice trays within, and an array of optical connectors mounted on a front panel. To gain access to the inside of the cabinet the front cover is removed. The front panel, which is hinged to the cabinet at one side of a front opening, is then pivoted relative to the front opening to expose the interior of the cabinet. In such apparatus, it is necessary to detach the stack of splice trays and move the stack forward in order for the trays to be readily accessible for repair, replacement or testing.

In a related patent application filed on May 2, 1988 entitled Fiber Distribution Panel naming Robert W. Barlow and David A. Cooper as applicants the foregoing shortcomings are overcome by providing a unit in which connector panel, splice shelf and cable storage are housed in a drawer as described therein. The present invention provides for another means of overcoming the foregoing shortcomings by providing stationary cassettes and connector panel and positioning one or more splice trays and cable take-up means in an access drawer.

It is desirable to provide interfacing apparatus for equipment containing optical fibers which can be tested and serviced from the front of the apparatus.

It is also desirable to provide interfacing apparatus for equipment containing optical fibers in which a stationary housing includes a moveable splice tray and cable storage unit wherein attenuation is not a problem and optical fiber bending is controlled.

It is further desirable to provide interfacing apparatus which can be mounted in standard equipment containing optical fiber, or upon a wall or the like.

It is further desirable to provide interfacing apparatus for equipment containing optical fibers which is compact and yet readily accessible.

It is also desirable to provide such equipment having improved fiber organization so that users can access specific fibers quickly and easily with less risk of breakage and improved productivity.

SUMMARY OF THE INVENTION

The invention achieves these and other results by providing apparatus for selectively interfacing first optical fibers with second optical fibers. The apparatus includes a housing comprising a base, an opposing top, first and second opposing side walls extending vertically from the base to the top, a rear wall extending vertically from the base to the top and extending from the first opposing side wall to the second opposing side wall, a forward opening opposite the rear wall, and means associated with the first and second side walls for slideably supporting a drawer within the housing so that the drawer can be slid relative to the rear wall into the housing and out of the housing at the forward opening. A drawer is provided for sliding upon the slideably supporting means, the drawer forming an enclosure including a bottom, first and second opposing side panels extending vertically from the bottom, a rear panel extending vertically from the bottom and extending from the first opposing side wall to the second opposing side panel, and a front panel opposite the rear panel and extending vertically from the bottom and extending from the first opposing side wall to the second opposing side wall. First means are positioned within the housing for storing the second optical fibers and second means are positioned within the enclosure for storing the first optical fibers and for storing a plurality of pigtails. Third means are positioned within the enclosure for splicing an end of respective of the first optical fibers to a corresponding first end of respective pigtails of the plurality of pigtails, and fourth means are positioned within the housing for optically connecting an end of respective of the second optical fibers to a corresponding second end of respective pigtails of the plurality of pigtails.

DESCRIPTION OF THE PREFERRED EMBODIMENT

Figure 1:
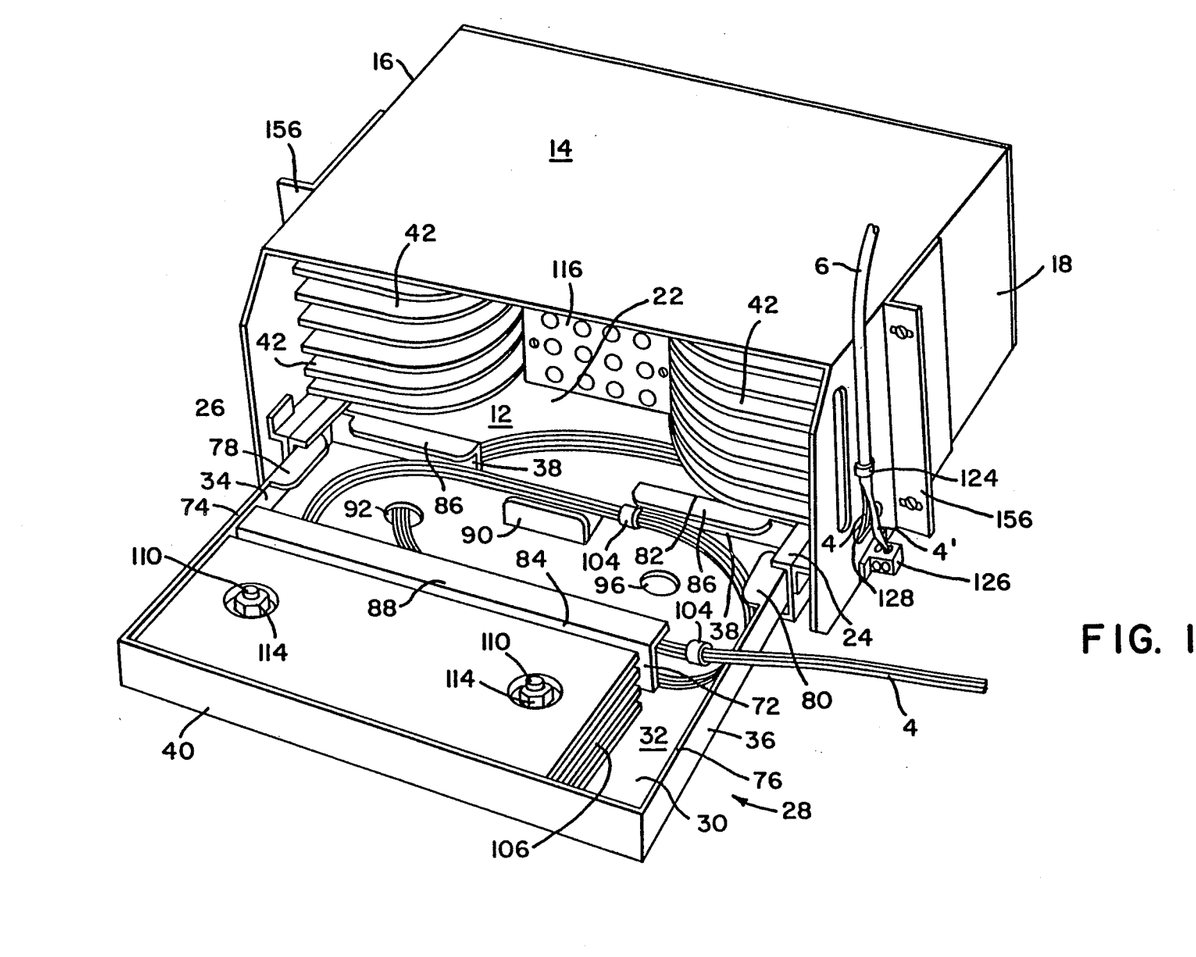
FIG. 1 is a perspective view of interfacing apparatus of the present invention.
Figure 2:
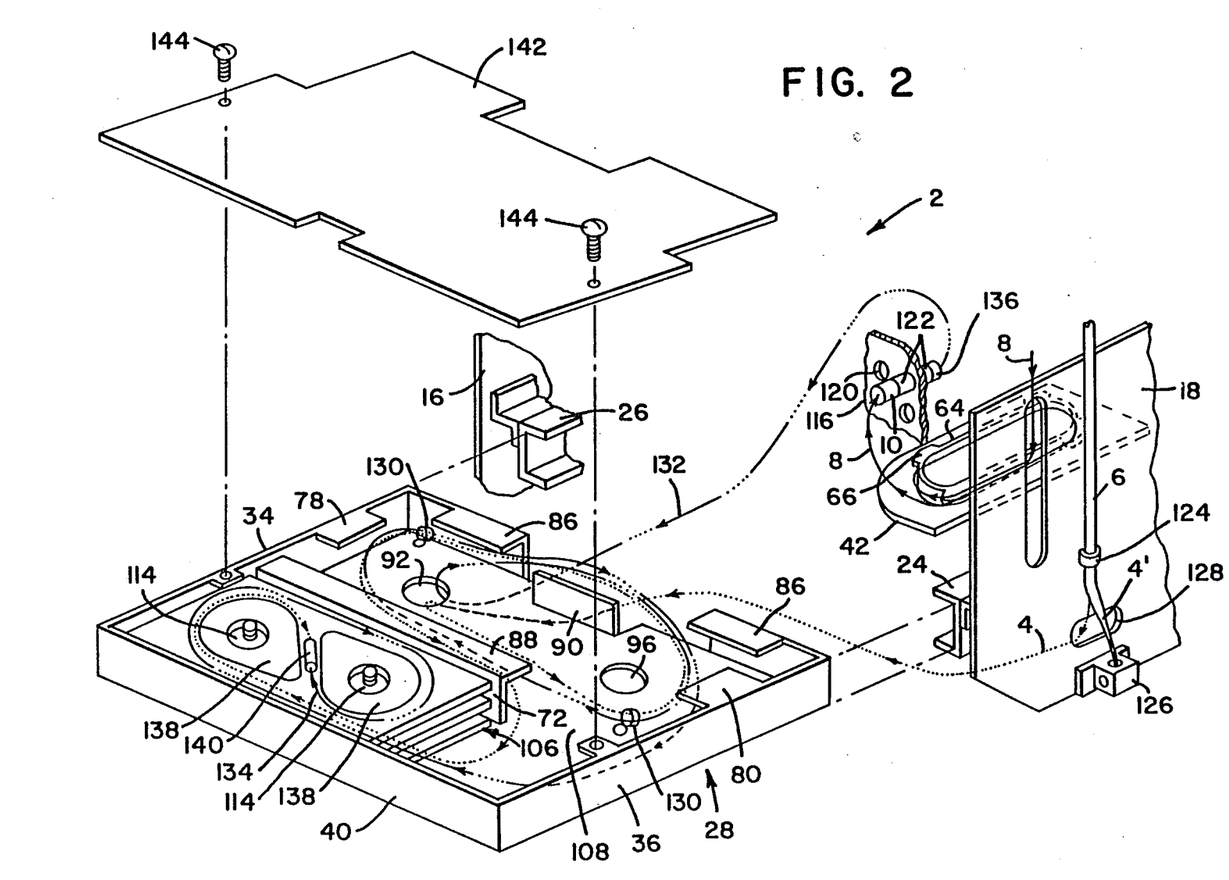
FIG. 2 is a partial exploded view of interfacing apparatus of the present invention.

The embodiment of this invention which is illustrated in the drawings is particularly suited for achieving the objects of this invention. FIGS. 1 and 2 depict an apparatus 2 for interfacing first optical fibers 4 of at least one first fiber optical cable 6 such as an external optical cable with second optical fibers 8 (not seen in FIG. 1) in the form of, for example, respective internal jumper patch cords. For example, the apparatus 2 is useful in interfacing outside plant cable 6 with inside plant cords 10 connected to telephone transmission equipment, not shown.

The apparatus 2 includes a housing comprising a base 12 and an opposing top 14. First opposing side wall 16 and second opposing side wall 18 are also provided extending vertically from base 12 to top 14. A rear wall 20 depicted in FIGS. 3 and 4 extends vertically from base 12 to top 14 and from first opposing side wall 16 to second opposing side wall 18. A forward opening 22 is provided opposite real wall 20. Means associated with the first and second side walls are provided for slideably supporting a drawer within the housing so that the drawer can be slid relative to the rear wall into the housing and out of the housing at the forward opening. For example, tracks 24 and 26 are provided in a known manner to facilitate such movement of a drawer 28.

Drawer 28 is provided for sliding upon the slideably supporting means such as tracks 24 and 26. Drawer 28 forms an enclosure 30 including a bottom 32, first opposing side panel 34 and second opposing side panel 36 each extending vertically from bottom 32, a rear panel 38 including two sections extending vertically from bottom 32, and a front panel 40 opposite the rear panel 38 and extending vertically from bottom 32 and extending from the first opposing side wall 34 to the second opposing side wall 36.

Figure 4:
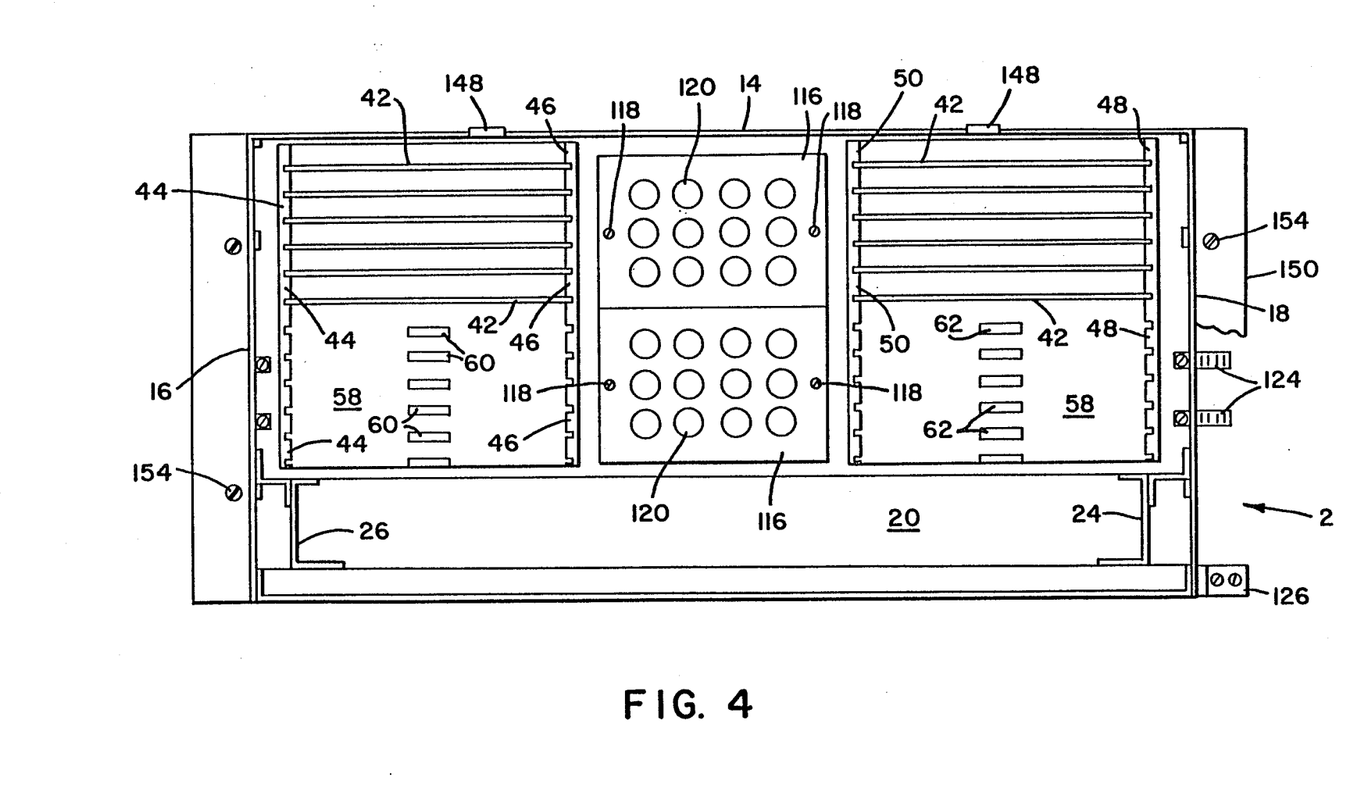
FIG. 4 is a front view of interfacing apparatus of the present invention.

First means are positioned within the housing for storing the second optical fiber 8. In the preferred embodiment such first means includes a plurality of removable cassettes 42. As best seen in FIG. 4, the housing includes a first plurality of opposing guides 44, 46 for guiding respective removable cassettes 42 into and out of the housing. Respective opposing guides 44, 46 are depicted as providing sets of tracks for the cassettes 42 to slide upon, respective pairs of tracks 44, 46 being stacked vertically towards the top 14, and extending towards the rear wall 20, of apparatus 2. Preferably, the first plurality of opposing guides 44, 46 are positioned towards a side of the housing adjacent the first opposing wall 16. The housing also preferably includes a second plurality of opposing guides 48, 50 for guiding additional respective removable cassettes 42 into and out of the housing. Respective opposing guides 48, 50 are identical to guides 44, 46. In other words, respective opposing guides 48, 50 are depicted as providing sets of tracks for the additional cassettes 42 to slide upon, respective pairs of tracks 48, 50 also being stacked vertically towards the top 14, and extending towards the rear wall 20, of apparatus 2. Preferably, the second plurality of opposing guides 48, 50 are positioned towards a side of the housing adjacent the second opposing wall 18.

Figure 5:
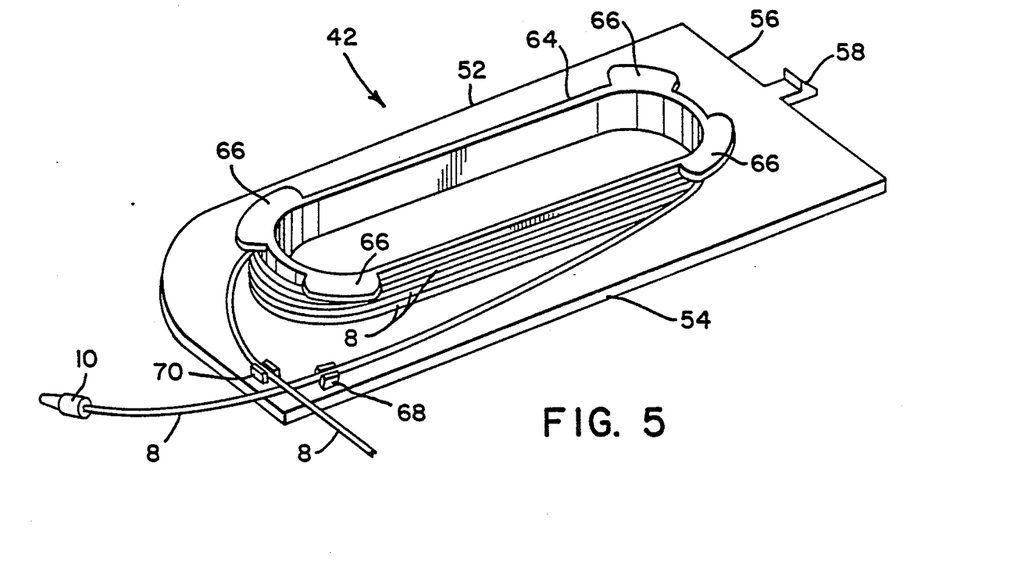
FIG. 5 is a perspective view of a cassette of the present invention.

Referring to FIG. 5, each respective cassette 42 includes opposing sides 52, 54 which slide upon respective of the opposing guides 44, 46 and 48, 50. In addition, each cassette 42 includes a rear edge 56 having a catch-like protuberance 58 extending therefrom. Referring to FIG. 4 which depicts some cassettes 42 in place and others removed, it will be observed that a rear abutment 58 is provided extending between respective opposing guides 44, 46 and between respective opposing guides 48, 50. Such rear abutment 58 includes a first plurality of apertures 60 each of which is positioned between a respective pair of opposing guides 44, 46. In the preferred embodiment apertures 60 are centered between respective guides 44, 46 as depicted in FIG. 4 so that when a cassette 42 is guided into the housing by sliding the cassette upon a pair of opposing guides, the catch-like protuberance 58 of such cassette will be received by the respective aperture 60 to lock the cassette in place. A similar second plurality of apertures 62 is provided each being positioned between a respective pair of opposing guides 48, 50 to receive a protuberanced 58 of a cassette 42 which is guided into the housing by sliding upon a pair of opposing guides 48, 50, in a like manner.

Referring to FIG. 5, it will be noted that each cassette 42 includes a hub 64 having flanges 66 and includes two pairs of spaced bosses 68, 70 each of which is designed in a known manner to pinch an optical fiber therebetween. Such structure allows an optical fiber 8 to be wound about the hub 64 to take up fiber slack and be held firmly in place by bosses 68, 70.

Second means are provided positioned within the enclosure 30 for storing the first optical fibers and for storing a plurality of pigtails. For example, in the preferred embodiment such second means includes a first divider 72 which extends vertically from bottom 32, is parallel to rear panel 38, and is positioned midway between front panel 40 and rear panel 38. First opposing side panel 34 and second opposing side panel 36 include respective upper edges 74 and 76 spaced from the bottom 32 and having respective first opposing flanges 78 and 80 extending therefrom generally parallel to base 32 as depicted in FIG. 1. In a like manner, the rear panel, which preferably is in the form of two sections 38, and the first divider 72, each include respective upper edges 82 and 84 spaced from bottom 32 and having respective second opposing flanges 86 and 88 extending therefrom. Preferably, such second means also includes a second divider 90 which extends vertically from bottom 32, is parallel to the rear panel 38, and is positioned between the rear panel 38 and the first divider 72. As depicted in FIGS. 1 and 2, preferably the bottom 32 includes a first aperture 92 positioned in an area adjacent the first opposing side panel 34 and a second aperture 96 positioned in an area adjacent the second opposing side panel 36. The structure thus far described provides a means for storing the first optical fibers 4.

Figure 6:
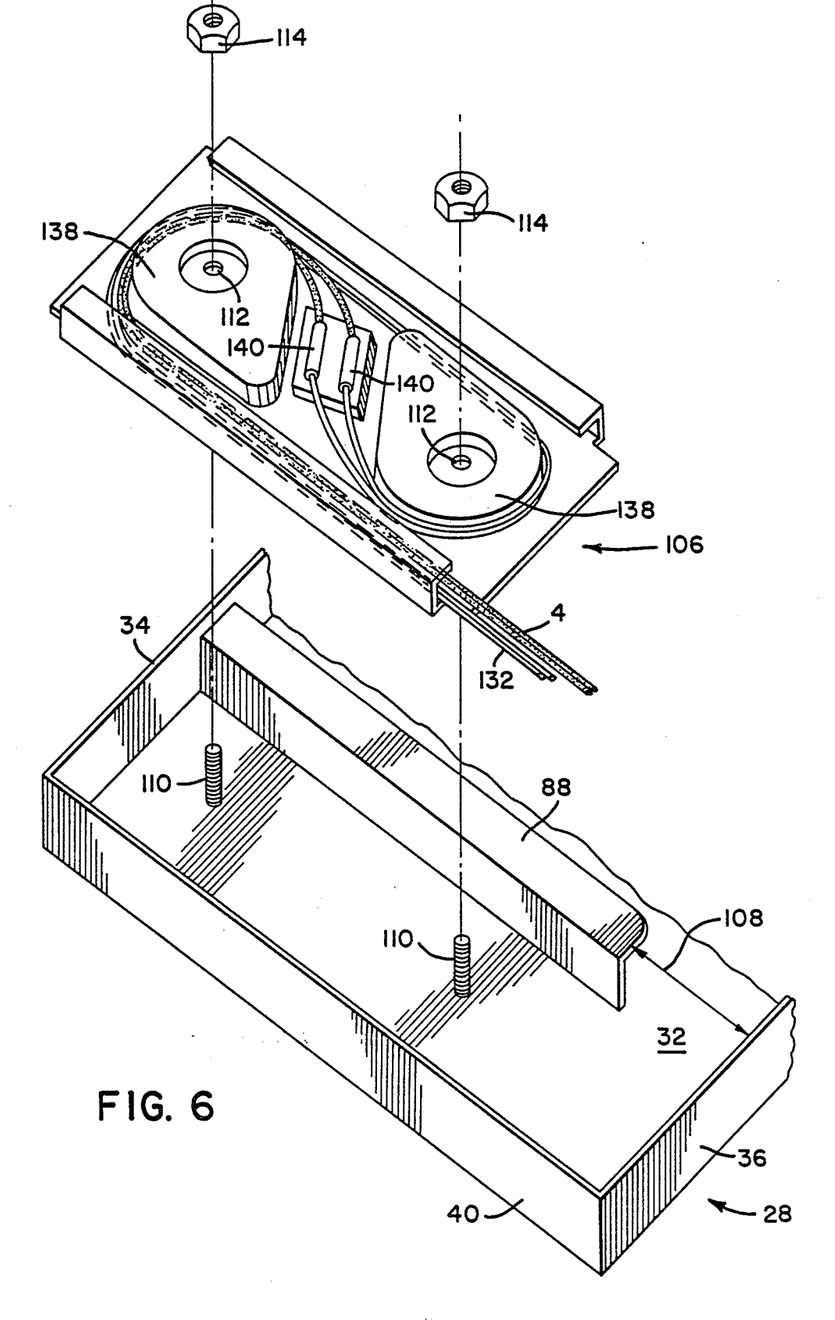
FIG. 6 is a partial exploded view of a drawer for use with interfacing apparatus of the present invention.

A third means is provided positioned within the enclosure 30 for splicing an end of respective of the first optical fibers 4 to a corresponding first end of respective pigtails which are provided as described herein. For example, in the preferred embodiment such third means includes at least one splice tray 106. Such splice tray is attached to the bottom 32 of the drawer 28 in an area between the front panel and the first divider 72. In such embodiment the first divider extends from the first opposing side panel 34 towards the second opposing side panel 36, the first divider 72 being spaced from the second opposing side panel 36 at 108 to provide an area through which fibers 4 and the pigtails can extend to the splice tray 106. Preferably, the splice tray 106 is attached to the drawer 28 by bolts 110 which extend vertically from bottom 32 of the drawer through apertures 112 in the splice tray 106 which is then held in place by nuts 114. A plurality of similar splice trays can be stacked upon one another when required as depicted in FIG. 6.

Apparatus 2 includes fourth means positioned within the housing for optically connecting an end of respective of the second optical fibers 8 to a corresponding second end of respective pigtails provided as described herein. For example, in the preferred embodiment such fourth means includes connector panels 116 which are positioned between the first plurality of opposing guides 44, 46 and the second plurality of opposing guides 48, 50 as depicted in FIG. 4, connector panels 116 being held in place by means of screws 118. Each connector panel includes a plurality of apertures 120 extending therethrough. Means are provided attached to each connector panel for optically connecting second optical fibers 8 to respective second ends of respective pigtails as described herein. For example, adapters or attenuators of a type known in the art and generally depicted at 122 are provided into which the second optical fiber 8 and the pigtails can be plugged in a known manner.

Figure 3:
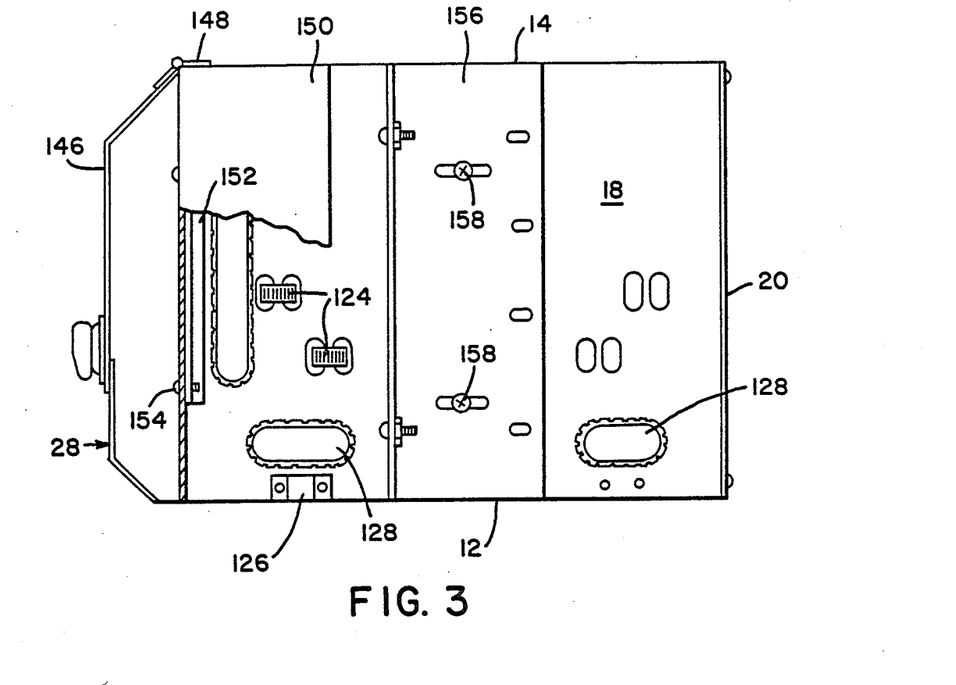
FIG. 3 is an end view of interfacing apparatus of the present invention.
Figure 8:
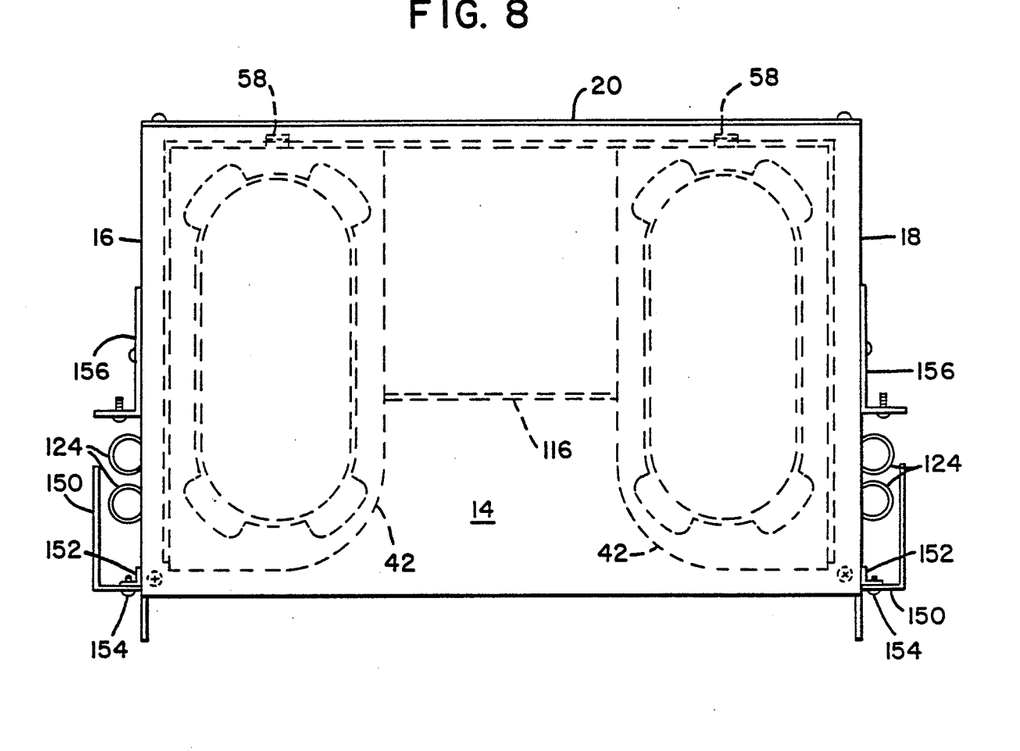

To render apparatus 2 operational, and referring to FIGS. 1 and 2, the outer sheath of cable 6 is stripped therefrom in a known manner to expose the buffered fibers 4 and strength member 4'. Subsequently the fibers 4, strength member 4', and cable 6 are inserted through a clamping member 124 positioned at second opposing side 18 and clamped firmly in place. The strength member 4' is then secured to a tire-off 126 in a known manner and the fibers 4 are routed through a cable entry 128, which extends through side 18, and onto to the drawer 28 via the entrance aperture 92, the fibers 4 being secured by tie wraps 130 as desired and the slack being taken up by wrapping the fibers 4 generally circularly in a counter-clockwise direction viewing FIG. 2 within the confirms of flanges 78, 80, 86 and 88. As depicted in FIGS. 3 and 8, the apparatus 2 can be provided with corresponding hardware and a second cable entry aperture 128 at the first opposing side 16 to increase the flexibility of the apparatus. Fibers extending from cable fastened at side 16 should be passed through entrance aperture 96. In other words, preferably the entrance aperture located on the side of the apparatus opposite the cable entry port is the one used to route fibers.

Figure 7:
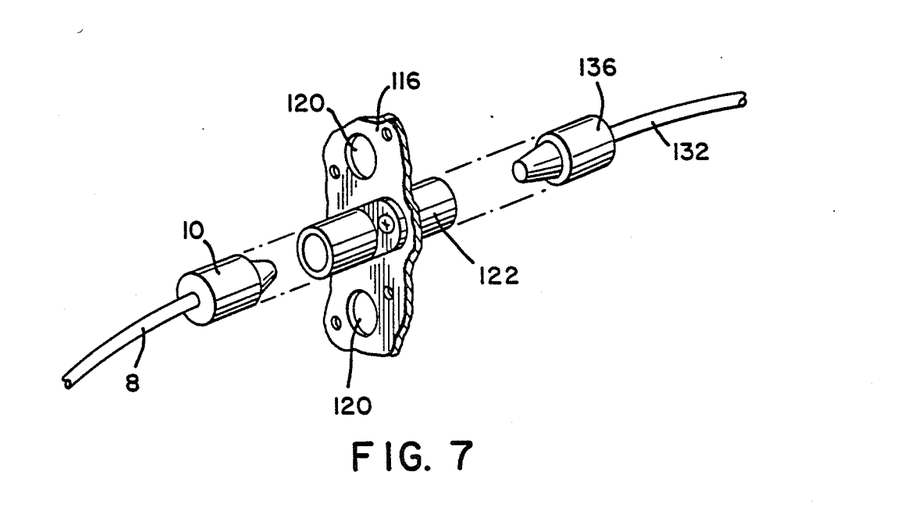
FIG. 7 is an exploded view of a connector panel for use with interfacing apparatus of the present invention; and, FIG. 8 is a plan view of interfacing apparatus of the present invention.

Fiber optical cables known as pigtails serve to bridge first optical fibers 4 and second optical fibers 8. For example, for each first fiber 4 to be connected to a corresponding second fiber 8, a pigtail 132 is provided. Each pigtail 132 includes a first end 134 and a second end 136. As depicted in FIG. 7, each end 136 is connected to an adapter or attenuator 122 at the rear of the connector panel 116 in a known manner. Each pigtail 132 is then routed onto drawer 28 via entrance aperture 92, the pigtails 132 being secured by tie wraps 130 as desired and the slack being taken up by wrapping the pigtails generally circularly in a clockwise direction viewing FIG. 2 within the confines of flanges 78, 80, 86 and 88. Each fiber 4 and pigtails 132 are then routed as depicted in FIGS. 2 and 6 through the space provided at 108, wrapped about take-up hubs 138 in a manner allowing fiber 4 and pigtail 132 to be optically coupled at a splice 140 in a known manner.

The inside optical fibers 8 are in the form of individual jumper patch cords and are coupled to the system as depicted in FIG. 2. Referring to FIGS. 2 and 7, each jumper patch cord includes an end 10 which is connected to the adapter or attenuator 122 at the front of the connector panel 116 in a known manner.

When all of the connections have been made a cover 142 is mounted upon drawer 28 by screws 144 and the drawer is closed. Then the front cover 146 is closed as depicted in FIG. 3 and locked in place. Preferably, front cover 146 is removably hinged to the top of the housing in a known manner at hinges 148 which are positioned adjacent the forward opening of the housing.

Referring to FIG. 3, the first opposing side wall 16 and the second opposing side wall 18 can each include a plurality of optical fiber apertures in the form of cable entry ports 128. In this manner, access can be provided at the front of apparatus 2 or at the rear of apparatus 2 through an aperture in a respective opposing side wall. In a like manner, a fifth means can be provided removably attached to the first and second opposing side walls 16, 18 for preventing damage to any optical fibers extending through any of the apertures 128. For example, fiber guards 150 can be attached to walls 16 and 18 in the vicinity of whatever aperture 128 is being used, by screwing the fiber guard to a mounting angle 152 by means of screws 154.

Adjustable mounting brackets 156 are provided so that by removing screws 158 the brackets 156 can be positioned to accommodate various sizes of equipment or to accommodate a wall mounting.

The apparatus of the present invention provides a means by which internal or inside optical fibers can be optically coupled to external or outside optical fibers using equipment which allows for testing and servicing from the front of apparatus which includes a stationary housing and moveable splice tray and cable storage unit. Optical fiber bending is controlled and attenuation is not a problem. The apparatus of the present invention is compact and can be mounted in standard equipment or upon a wall or the like, and yet is readily accessible. Fiber organization is improved so that users can access specific fibers quickly and easily with less risk of breakage and improved productivity.

The embodiments which have been described herein are but some of several which utilize this invention and are set forth here by way of illustration but not of limitation. It is apparent that many other embodiments which will be readily apparent to those skilled in the art may be made without departing materially from the spirit and scope of this invention.

We claim:

1. Apparatus for selectively interfacing first optical fibers with second optical fibers comprising:

a housing comprising a base and an opposing top, first and second opposing side walls extending vertically from said base to said top, a rear wall extending vertically from said base to said top and extending from said first opposing side wall to said second opposing side wall, a forward opening opposite said rear wall, and means associated with said first and second side walls for slideably supporting a drawer within said housing so that said drawer can be slid relative to said rear wall into said housing and out of said housing at said forward opening;

a drawer for so sliding upon said slideably supporting means, said drawer forming an enclosure including a bottom, first and second opposing side panels extending vertically from said bottom, a rear panel extending vertically from said bottom, and a front panel opposite said rear panel and extending vertically from said bottom and extending from said first opposing side wall to said second opposing side wall;

first means positioned within said housing for storing said second optical fibers;

second means positioned within said enclosure for storing said first optical fibers and for storing a plurality of pigtails;

third means positioned within said enclosure for splicing an end of respective of said first optical fibers to a corresponding first end of respective pigtails of said plurality of pigtails; and, fourth means positioned within said housing for optically connecting an end of respective of said second optical fibers to a corresponding second end of respective pigtails of said plurality of pigtails.

2. The apparatus of claim 1 wherein said first means includes a plurality of removable cassettes.

3. The apparatus of claim 2 wherein said first means further includes a first plurality of opposing guides for guiding said plurality of removable cassettes into and out of said housing, respective opposing guides of said first plurality of opposing guides being stacked vertically towards said top and extending towards said rear wall, said first plurality of opposing guides being positioned towards a side of said housing adjacent said first opposing wall, and a second plurality of opposing guides for guiding said plurality of removable cassettes into and out of said housing, respective opposing guides of said second plurality of opposing guides being stacked vertically towards said top and extending towards said rear wall, said second plurality of opposing guides being positioned towards a side of said housing adjacent said second opposing side wall.

4. The apparatus of claim 3 wherein each respective cassette of said plurality of removable cassettes includes opposing sides which slide upon respective of said opposing guides, and further includes a rear edge having a catch-like protuberance extending therefrom, and further wherein said first means includes a rear abutment extending between said respective opposing guides of said first plurality of opposing guides and between respective opposing guides of said second plurality of opposing guides, said rear abutment including a first plurality of apertures, each aperture of said first plurality of apertures being positioned between respective opposing guides of said first plurality of opposing guides for receiving a respective catch-like protuberance when a respective cassette of said plurality of removable cassettes is guided by respective opposing guides of said first plurality of opposing guides into said housing, and a second plurality of apertures, each aperture of said second plurality of apertures being positioned between respective opposing guides of said second plurality of opposing guides for receiving a respective catch-like protuberance when a respective cassette of said plurality of removable cassettes is guided by respective opposing guides of said second plurality of opposing guides into said housing.

5. The apparatus of claim 4 wherein said second means includes a first divider which extends vertically from said bottom, is parallel to said rear panel, and is positioned between said front panel and said rear panel, and further wherein said first and second opposing side panels include respective upper edges spaced from said bottom and having respective first opposing flanges extending therefrom and said rear panel and said first divider include respective upper edges spaced from said bottom and having respective second opposing flanges extending therefrom.

6. The apparatus of claim 5 wherein said second means includes a second divider which extends vertically from said bottom, is parallel to said rear panel, and is positioned between said rear panel and said first divider, and further wherein said bottom includes a first aperture positioned in an area adjacent said first opposing side panel and a second aperture positioned in an area adjacent said second opposing side panel.

7. The apparatus of claim 6 wherein said third means includes at least one splice tray, said at least one splice tray being attached to said bottom of said drawer in an area between said front panel and said first divider, said first divider extending from said first opposing side panel towards but being spaced from said second opposing side panel.

8. The apparatus of claim 7 wherein said fourth means includes at least one connector panel positioned between said first plurality of opposing guides and said second plurality of opposing guides.

9. The apparatus of claim 8 further including means attached to said connector panel for optically connecting said end of a respective of said second optical fibers to a corresponding second end of a respective pigtail.

10. The apparatus of claim 1 wherein said second means includes a first divider which extends vertically from said bottom, is parallel to said rear panel, and is positioned between said front panel and said rear panel, and further wherein said first and second opposing side panels include respective upper edges spaced from said bottom and having respective first opposing flanges extending therefrom, and said rear panel and said first divider include respective upper edges spaced from said bottom and having respective second opposing flanges extending therefrom.

11. The apparatus of claim 10 wherein said second means includes a second divider which extends vertically from said bottom, is parallel to said rear panel, and is positioned between said rear panel and said first divider, and further wherein said bottom includes a first aperture positioned in an area adjacent said first opposing side panel and a second aperture positioned in an area adjacent said second opposing side panel.

12. The apparatus of claim 1 wherein said third means includes a least one splice tray.

13. The apparatus of claim 1 wherein said fourth means includes at least one connector panel.

14. The apparatus of claim 1 wherein said drawer includes a cover.

15. The apparatus of claim 1 wherein said housing includes a front cover removably hinged to said top adjacent said forward opening.

16. The apparatus of claim 1 wherein said first and second opposing side walls each include a plurality of optical fiber apertures.

17. The apparatus of claim 16 further including fifth means removably attached to said first and second opposing side walls for preventing damage to any optical fibers extending through any of said plurality of optical fiber apertures.

18. Apparatus selectively interfacing first optical fibers with second optical fibers, comprising:

a housing comprising a base and an opposing top, first and second opposing side walls extending vertically from said base to said top, at least one optical fiber aperture extending through at least one of said first and second opposing side walls, a rear wall extending vertically from said base to said top and extending from said first opposing side wall to said second opposing side wall, a forward opening opposite said rear wall, and means associated with said first and second side walls for slideably supporting a drawer within said housing so that said drawer can be slid relative to said rear wall into said housing and out of said housing at said forward opening;

a drawer for so sliding upon said slideably supporting means, said drawer forming an enclosure including a bottom, first and second opposing side panels extending vertically from said bottom, a rear panel exending vertically from said bottom, and a front panel opposite said rear panel and extending vertically from said bottom and extending from said first opposing side wall to said second opposing side wall;

first means positioned within said housing for storing said second optical fibers, said second optical fibers extending into said housing through one of said at least one optical fiber aperture;

second means positioned within said enclosure for storing said first optical fibers and for storing a plurality of pigtails, said first optical fibers extending into said housing through one of said at least one optical fiber aperture;

third means positioned within said enclosure for splicing an end of respective of said first optical fibers to a corresponding first end of respective pigtails of said plurality of pigtails; and, fourth means positioned within said housing optically connecting an end of respective of said second optical fibers to a corresponding second end of respective pigtails of said plurality of pigtails.

19. The apparatus of claim 18 wherein:

said first means includes a plurality of removable cassettes;

said second means includes a first divider which extends vertically from said bottom, is parallel to said rear panel, and is positioned between said front panel and said rear panel, and further wherein said first and second opposing side panels include respective upper edges spaced from said bottom and having respective first opposing flanges extending therefrom, and said rear panel and said first divider include respective upper edges spaced from said bottom and having respective second opposing flanges extending therefrom;

said third means includes at least one splice tray; and, said fourth means includes a connector panel.

20. The apparatus of claim 19 further including means attached to said connector panel optically connecting said end of a respective of said second optical fibers to a corresponding second end of a respective pigtail.

* * * * *